United States Patent
Cooper et al.

(10) Patent No.: US 7,175,915 B2
(45) Date of Patent: Feb. 13, 2007

(54) METHOD OF PRODUCING POLYURETHANE PADS PRODUCED THEREWITH

(75) Inventors: Alex Cooper, Brooklyn, NY (US); Sergey Vladimirtsev, Brooklyn, NY (US); Yevgeny Bederak, New York, NY (US)

(73) Assignee: Universal Photonics, Hicksville, NY (US)

( * ) Notice: Subject to any disclaimer, the term of this patent is extended or adjusted under 35 U.S.C. 154(b) by 0 days.

(21) Appl. No.: 10/822,879

(22) Filed: Apr. 13, 2004

(65) Prior Publication Data

US 2005/0227088 A1    Oct. 13, 2005

(51) Int. Cl.
*C08G 18/32*    (2006.01)
(52) U.S. Cl. ............. 428/423.9; 156/327; 156/307.1; 428/420; 428/423.3; 428/424.8; 428/423.9
(58) Field of Classification Search ............. 428/420, 428/423.3, 424.8, 423.9; 156/327, 307.1
See application file for complete search history.

(56) References Cited

U.S. PATENT DOCUMENTS

| | | | | |
|---|---|---|---|---|
| 3,265,669 A | * | 8/1966 | Hirosawa | 528/53 |
| 4,198,739 A | * | 4/1980 | Budinger et al. | 492/56 |
| 5,225,248 A | * | 7/1993 | Stephenson | 427/333 |
| 5,314,945 A | * | 5/1994 | Nickle et al. | 524/507 |
| 2003/0148037 A1 | * | 8/2003 | McKeand | 427/446 |

* cited by examiner

Primary Examiner—Rachel Gorr
(74) Attorney, Agent, or Firm—I. Zborovsky

(57) ABSTRACT

A method of producing polyurethane pads and other articles has the steps of providing at least one polyurethane layer having a first curing agent, providing a second polymer layer having a second curing agent, providing a connecting layer between the first and second layers with the first curing agent as in the first polyurethane layer, and subjected the layers to a thermal treatment so that the same first curing agent migrates from the connecting layer to the first polyurethane layer and vice versa. Also, an article produced by the method is proposed.

3 Claims, 1 Drawing Sheet

METHOD OF PRODUCING POLYURETHANE PADS PRODUCED THEREWITH

BACKGROUND OF THE INVENTION

The present invention relates to a method of producing polyurethane pads and a pad produced thereby.

It is known to produce polyurethane pads for grinding and polishing. Some solution for producing grinding and polishing pads are disclosed for example in U.S. Pat. Nos. 4,692,199; 5,257,478; 5,900,164. It is believed that the known solutions can be improved.

SUMMARY OF THE INVENTION

Accordingly, it is an object of the present invention to provide a method of producing polyurethane pads and a pad produced thereby, which is a further improvement of the existing methods and articles.

In keeping with these objects and with others which will become apparent hereinafter, one feature of the present invention resides, briefly stated, in a method of making a polyurethane pad, comprising the steps of preparing a mixture of components for producing a working layer including with a quantity of a curing agent sufficient for curing the working layer; removing a part of the quantity of the curing agent required for curing on the working layer; preparing a mixture of components for producing a polyurethane body of the paint, with a quantity of a curing agent sufficient for curing the body; removing a part of the quantity of the curing agent from the mixture of the components for the body; preparing a mixture of components for a connection layer including a quantity of a curing agent which is at least equal to the part of the quantity of the curing agent removed from the mixture for the working layer plus the part of the quantity of the curing agent removed from the mixture for the body; and jointly thermally treating of the working layer and the body with the connecting layer therebetween, so that the curing agent from the connecting layer migrates into the working layer and into the body to provide in the working layer and in the body the quantity of the curing agent required for curing of the working layer and the body correspondingly.

When a polishing pad is produced in accordance with the present invention, its layers are reliably connected with one another to provide a solid composite article.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a multi-layered article produced in accordance with the present invention.

DESCRIPTION OF THE PREFERRED EMBODIMENTS

Figure 1:
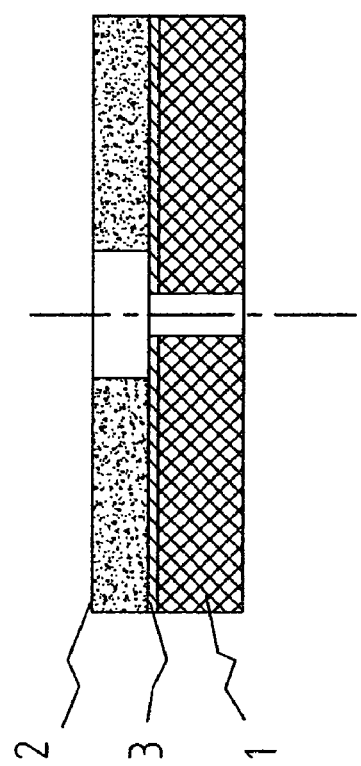
FIG. 1 is a view showing a grinding or polishing pad produced by a new method in accordance with the present invention and including a body, a connecting layer, and a working layer composed of polyurethane.

A method of producing a poyurethane pad in accordance with the present invention is shown in FIG. 1. The pad here includes a body which is identified with reference numeral 1, a working layer which is identified with reference numeral 2, and a connecting layer which is identified with reference numeral 3.

The body 1 can be composed of ebonite, polyurethane and the like and is substantially hard to form a hard backing for the pad. The working layer 2 is also composed of a polyurethane. It has a polyurethane base, a curing agent, and also can have with abrasive as well as other ingredients.

The connecting layer 3 can be formed as a connecting film cohesively connecting the working layer 2 with the body 1. The body 1 is produced for example so that after curing it has hardness 30–75 on Shore D scale.

The connecting film 3 can be an elastomeric film, composed for example of butadiene rubber. It can have a thickness of between 20 and 1000 μm.

The working layer 2 composed of polyurethane has a curing agent diamine, for example diamine with trade name MOCA, $NH_2-R-NH_2$.

The composition of the polyurethane working layer 2 can be for example as follows:

| Component | Part by weight |
| --- | --- |
| Spec flex NC 630 Polyols | 80.0 |
| Spec flex NC 710 Copolymer | 20.0 |
| Cross-linker | 1.5 |
| Water | 2.2 |
| Catalyst | 0.6 |
| Colorant | 0.3 |
| Adhesion promoter | 2.0 |
| Cell opener | 1.0 |

The basic properties of polyurethane composition matched to the intended proper choice of the polyols, copolymer polyols, chain extender, cross-linker and the functionality of the isocyanate. Variation in the final molecular weight per-crosslink ($M_c$) can change from rigid ($M_c$~from 300 to 800), to semi-rigid ($M_c$-from 800 to 2000) and $M_c$~above 2000 are flexible.

A simple composition can include:

| Component | Part by Weight |
| --- | --- |
| Prepolymer RN-15/3 NCO-9.5% | 199.0 |
| Water, blowing agent | 0.4 |
| Surfactants, DC-200; BC-57 | 2.5 |
| Curing agent and Cross Linker, MOCA (in powder form) | 40.0 |
| Linker, MOCA (in powder form) | 40.0 (Regular amount is 55) |
| Catalytic blowing reactant, A530 | 0.1 |

Curing and cross linker agent MOCA (chemical name is: 4,4' methylenbis (2-chloroanilin) create carbamid cross links.

Connection layer between two parts has compositions:

| Component | Part by Weight |
|---|---|
| Elastomere (trade name OZO-70/30) | 100.0 |
| Crosslink and curing agent, Sulfur | 10.0 |
| SOftener, PVC | 3.0 |
| Hardener, Duress 12687 | 4.0 |
| Accelerator, Altax | 1.5 |
| Additional cross linker and curing Agent, MOCA in powder form | 15.0 |

In accordance with the present invention, the amount of curing agent in the body 1 and the working layer 2 is reduced far example to 75–80% of conventionally used amounts. The same curing agent, for example MOCA is introduced into the connecting layer 3 in the amount, by which the amount of the curing agent is reduced in the body 1 and the working layer 2 to be connected. If the body 1 is not composed of polyurethane, the amount of its curing agent can be retained the same, while the amount of MOCA in the working layer 2 is reduced to 75–80%, and the connecting layer 3 is provided with MOCA corresponding to the missing 25–20%.

After the body 1 and the working layer 2 are formed of an initial material, they are placed over one another with interposition of the connecting layer and together introduced into mold for thermal treatment. During the thermal treatment the curing agent or MOCA migrates from the connecting layer 3 into body 1 and the working layer 2 and vice versa if the body 1 and the working layer 2 are composed of polyurethane. If the body 1 is composed not of polyurethane but instead of ebonite, then MOCA migrates between the working layer 2 and the connecting layer 3 and from the connecting layer 3 into the body 1, while the curing agent of the body 1 (for example sulfur) migrates into the connecting layer 3.

As a result, a film connection of the body 1 with the working layer 2 through the connecting layer 3 is provided.

FIG. 2 shows a multi-layered article which includes a first polymer layer 11, a first connecting layer 12, a second polymer layer 13, a second connecting layer 15, a third polymer layer 16, a third connecting layer 16, and a fourth polymer layer 17. The polymer layers and the connecting layers are initially produced in the same way as in the embodiment of FIG. 1. For example, in the polymer layers 11 and 13, the amount of curing agent of or MOCA is reduced for example by 20%, while the quantity corresponding to the 20% is introduced in the connecting layer 12. During the heat treatment and corresponding process of polymerization, the curing agent migrates between the polymer layers to be connected and the connecting layer therebetween, so as to provide a firm connection.

It will be understood that each of the elements described above, or two or more together, may also find a useful application in other types of constructions differing from the types described above.

While the invention has been illustrated and described as embodied in a method of producing of articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of making a polyurethane pad, comprising the steps of preparing a mixture of components for producing a working layer with a quantity of a curing agent sufficient for curing the working layer; removing a part of the quantity of the curing agent from the mixture of the components for the working layer; preparing a mixture of components for producing a polyurethane body with a quantity of a curing agent sufficient for curing the body; removing a part of the quantity of the curing agent from the mixture of the components for the body; preparing a mixture of components for a connection layer including a quantity of a curing agent which is at least equal to the part of the quantity of the curing agent removed from the mixture of the components for the working layer plus the part of the quantity of the curing agent removed from the mixture of the components for the body; and jointly thermally treating the working layer and the body with the connecting layer therebetween, so that the curing agent from the connecting layer migrates into the working layer and into the body to provide in the working layer and in the body the quantity of the curing agent required for curing of the working layer and the body correspondingly.

2. A method of producing a polyurethane pad including a working layer, a body and a connecting layer which connects the working layer with the body, the method comprising the steps of preparing a mixture of components for the working layer, including a curing agent in a quantity which is insufficient for curing the working layer; preparing a mixture of components for the body with a curing agent in a quantity which is insufficient for curing of the body; preparing a mixture of components for a connecting layer with a quantity of the curing agent which is sufficient to supplement the curing agent in the working layer and the curing agent in the body so as to provide a quantity of the curing agent in the working layer sufficient for curing the working layer and a quantity of the curing agent in the body sufficient for curing the body; and thermally treating the working layer, the connecting layer and the body together so that the curing agent migrates from said connecting layer into said working layer and into said body.

3. A method of making a polyurethane pad, comprising the steps of preparing a mixture of components for producing a working layer including a curing agent in a quantity sufficient for curing the working layer; removing a part of substantially 20–25% of the curing agent required for curing the working layer; preparing a mixture of components for producing a polyurethane body, including a quantity of curing agent which is required for curing; removing a part of substantially 20–25% of the curing agent from the mixture of the components for the body; preparing a mixture of components for a connecting layer including a quantity of a curing agent which is at least equal to 20–25% of the curing agent removed from the mixture for the working layer plus 20–25% of the curing agent removed from the mixture for the body; and jointly thermally treating the working layer and the body with the connecting layer therebetween, so that the curing agent from the connecting layer migrates into the working layer and into the body to provide in the working layer and in the body the quantity of the curing agent required for curing the working layer and the body correspondingly.

* * * * *